United States Patent
Ali et al.

(10) Patent No.: US 9,702,552 B2
(45) Date of Patent: Jul. 11, 2017

(54) METHOD AND SYSTEM FOR PRODUCING ENERGY FROM WASTE

(75) Inventors: Mazlan Ali, Taman Setiawangsa (MY); Siti Fatimah Mohd Shariff, Taman Setiawangsa (MY); Christopher John Webb, Newbury (GB)

(73) Assignee: GREEN ENERGY AND TECHNOLOGY SDN. BHD., Kuala Lumpur (MY)

( * ) Notice: Subject to any disclaimer, the term of this patent is extended or adjusted under 35 U.S.C. 154(b) by 0 days.

(21) Appl. No.: 13/698,254

(22) PCT Filed: Aug. 13, 2010
(Under 37 CFR 1.47)

(86) PCT No.: PCT/MY2010/000144
§ 371 (c)(1),
(2), (4) Date: Jul. 1, 2013

(87) PCT Pub. No.: WO2011/145917
PCT Pub. Date: Nov. 24, 2011

(65) Prior Publication Data
US 2013/0300121 A1    Nov. 14, 2013

(30) Foreign Application Priority Data
May 19, 2010    (WO) ............... PCT/MY2010/000082

(51) Int. Cl.
*F23G 5/46*        (2006.01)
*F23J 15/02*       (2006.01)
(Continued)

(52) U.S. Cl.
CPC ............... *F23G 5/027* (2013.01); *C10J 3/08* (2013.01); *C10J 3/20* (2013.01); *F01D 13/00* (2013.01);
(Continued)

(58) Field of Classification Search
CPC ......... Y02E 20/16; Y02E 20/18; Y02E 50/12; Y02E 50/32; Y02E 20/12; F23G 5/46; F23J 15/02; Y02P 20/129
(Continued)

(56) References Cited

U.S. PATENT DOCUMENTS 3,510,253 A * 5/1970 Petersen et al. ......... 423/243.06
4,925,632 A   5/1990 Thacker et al.
(Continued)

FOREIGN PATENT DOCUMENTS

| CN | 101565629 A | 10/2009 |
|---|---|---|
| WO | 2007/037768 A1 | 4/2007 |

*Primary Examiner* — Mark Laurenzi
*Assistant Examiner* — Wesley Harris
(74) *Attorney, Agent, or Firm* — Maschoff Brennan

(57) ABSTRACT

A method and system for the conversion of waste into energy in a sealed system where combustion does not take place and the operating pressure prior to the inlet of the steam or power generating equipment is maintained below atmospheric pressure. Destruction of the RDF (refuse derived fuel) is accomplished by subjecting the RDF to a high temperature environment under controlled conditions in a purpose designed and built reactor. The high temperature environment, <5000° C., is achieved through the use of one or more non-transferred plasma torches for generation of plasma gas. The plasma gas exiting the torch and provides the thermal energy for the continual gasification of metallurgic coke configured as a carbon bed in the lower part of the reactor, which acts as a thermal catalyst and this provides the thermal energy for the gasification process.

18 Claims, 9 Drawing Sheets

(51) Int. Cl.
F23G 5/027 (2006.01)
F23G 5/08 (2006.01)
F23G 7/00 (2006.01)
F23G 7/12 (2006.01)
C10J 3/08 (2006.01)
C10J 3/20 (2006.01)
F01D 13/00 (2006.01)
F01D 15/10 (2006.01)
F23G 5/033 (2006.01)
F23G 5/04 (2006.01)

(52) U.S. Cl.
CPC ........... *F01D 15/10* (2013.01); *F23G 5/0276* (2013.01); *F23G 5/033* (2013.01); *F23G 5/04* (2013.01); *F23G 5/085* (2013.01); *F23G 5/46* (2013.01); *F23G 7/003* (2013.01); *F23G 7/12* (2013.01); *F23J 15/02* (2013.01); *C10J 2300/0943* (2013.01); *C10J 2300/0946* (2013.01); *C10J 2300/0996* (2013.01); *C10J 2300/1238* (2013.01); *F23G 2202/20* (2013.01); *F23G 2203/403* (2013.01); *F23G 2206/203* (2013.01); *F23G 2207/30* (2013.01); *F23G 2207/60* (2013.01); *F23G 2209/281* (2013.01); *Y02E 20/12* (2013.01); *Y02E 20/16* (2013.01); *Y02E 20/18* (2013.01); *Y02E 50/12* (2013.01); *Y02E 50/32* (2013.01); *Y02P 20/129* (2015.11)

(58) Field of Classification Search
USPC .............. 60/670, 39.182, 780, 39.12, 39.464
See application file for complete search history.

(56) References Cited

U.S. PATENT DOCUMENTS

| 5,085,738 | A | | 2/1992 | Harris et al. |
| 5,280,757 | A | | 1/1994 | Carter et al. |
| 6,149,773 | A | * | 11/2000 | Grimshaw et al. ............. 201/21 |
| 2007/0256361 | A1 | * | 11/2007 | Kindig ........................ 48/197 R |
| 2007/0289509 | A1 | | 12/2007 | Vera |
| 2009/0062581 | A1 | * | 3/2009 | Appel et al. .................. 585/241 |
| 2009/0064581 | A1 | | 3/2009 | Nielsen et al. |
| 2009/0133407 | A1 | | 5/2009 | Sawyer |

\* cited by examiner

METHOD AND SYSTEM FOR PRODUCING ENERGY FROM WASTE

FIELD OF INVENTION

The present invention relates to a thermal reactor for the generation of heat energy and other recyclable by-products by the destruction of organic and inorganic waste.

BACKGROUND OF INVENTION

The need for efficient and environmentally sound methods of waste disposal is ever more urgent. Landfills have been used extensively for waste disposal, since landfill usage typically requires only the collection and transport of the waste to the site. However, landfills require space, and that is something many countries have less and less of, particularly in and adjacent to urban areas, which areas generate the greatest volume of waste material. Landfills, if unsecure, are also not an environmentally friendly solution.

Waste organic materials may decompose and yield harmful products capable of contaminating the soil and ground water. Other organic wastes (such as vehicle tyres and plastic products) exhibit little or no decomposition in a landfill. At present, there are many landfills devoted exclusively to used vehicle tyres, some containing several million tyres each. Any fire in such tyre dumps are extremely difficult to extinguish, and emit huge amounts of pollution. It is therefore desirable to destroy the waste as opposed to merely storing it.

One known method of disposing organic waste is by gasification, which is a process whereby the waste is subjected to high temperature in a low oxygen environment to produce a synthesis gas. U.S. Pat. No. 4,025,532 to Meuser et al. and U.S. Pat. No. 5,085,738 to Harris et al. disclose apparatuses for continuous feed pyrolysis processes having an oxygen free atmosphere over a molten metal bath in which organic solids are thermally converted to hydrocarbon vapors, particulate matter and residual solids. However, both of these processes have been found to have too many operational problems to be commercially viable. The problems include difficulties with the separation and removal of particulate matter and residual solids and, referring particularly to the apparatus in U.S. Pat. No. 5,085,738, difficulties in maintaining an oxygen free atmosphere over the molten metal bath while continually feeding the organic solids therein.

Other known methods have other kinds of drawbacks, such as producing pollutants during the disposal process, not being able to process inorganic waste along with the organic fraction of the waste, or do not produce enough energy even to support the waste disposal process.

What is needed in the art is a method or system that is able to destroy waste in a safe and controlled environment, generate energy and produce useable fuel and recyclable by-products from the destruction of the waste.

SUMMARY OF INVENTION

The present invention seeks to eradicate the aforementioned disadvantages by providing an apparatus that is able to destroy waste in a safe and controlled environment.

It is also an objective of the present invention to provide an apparatus that is able to generate energy from the destruction of waste.

It is a further objective of the present invention to provide an apparatus that is able to produce recyclable by-products from the destruction of waste.

The present invention thus relates to an unsurpassed innovative method for the destruction of all types of waste, excluding nuclear waste, in a sealed system where combustion does not take place and the operating pressure is maintained below atmospheric pressure until it become necessary to increase it for operational reasons. Destruction of the RDF (refuse derived fuel), without combustion, is accomplished by subjecting the RDF to a high temperature environment under controlled conditions in a purpose designed and built Advanced Thermal Gasification Reactor (ATGR). The high temperature environment, 5000° C. to 3000° C., is achieved through the use of one or more non-transferred plasma arc torches for generation of plasma gas. The plasma gas exiting the torch provides the thermal energy for the continual gasification of metallurgic coke configured as a carbon bed in the lower part of the ATGR, which acts as a thermal catalyst and this provides the thermal energy in the ATGR for the gasification process. The extreme temperatures in a sub-stoichiometric environment causes the thermal depolymerization/gasification and by dissociating the molecular bonds of the RDF converts the organic compounds to a Syngas while the inorganic compounds are converted to a molten lava which is vitrified to make an inert slag material. By maintaining the mass of the metallurgic coke bed in a sintered condition a barrier is created between the lower part of the ATRG and the gasification zone. Free oxygen percolating through the carbon bed is converted mainly to CO and through a unique CO enhancement system located above the carbon bed CO production is increased and $CO_2$ production is minimized, typically $CO_2$ is <3 v %. Additionally, because the gasification process takes place at extreme temperatures and in a sub-stoichiometric environment the production of Furan and/or Dioxin in the ATGR is completely avoided and so will not be present in the resultant syngas. Syngas produced from the organic faction of the RDF exits the ATGR at between 1250° C. to 1400° C. and enters a special purpose designed Waste Heat Steam Generator (WHSG) which produces high pressure steam. The high pressure steam from the WHSG is added to the high pressure steam produced in the steam boilers, or if the plant is designed for combine cycle power generation, the high pressure steam will be added to the high pressure stream produced in the Heat Recovery Steam Generator (HRSG). In both cases the high pressure steam produced in the WHSG provides additional energy which increases the renewable energy recovered from the waste. After the pressure of the high pressure steam is reduced in the steam turbine, some of the resultant low pressure steam, is made available for use in the waste dryer and for use in the emission control in the continual emission monitoring systems. After the syngas has given up a high proportion of its sensible heat for the generation of high pressure steam in the WHSG, its temperature will have been reduced to ~200° C. this temperature is controlled to ensure the syngas on entering the downstream syngas filtering and conditioning equipment will not cause high temperature corrosion, and it also ensures syngas does not enter the activated carbon filters above the Auto Ignition Temperature (AIT) of the activated carbon. The syngas having had its temperature reduced to <200° C. exits the WHSG and is drawn through a syngas filtering, cleaning and conditioning system after which it is compressed prior to being finally delivered to ether a Gas Turbine Generator for power generation, or to a Steam Boiler for the generation of high pressure steam to be used in a Steam Turbine Generator. The ability for the steam to be used in other applications such as, district heating system, or in an absorption refrigeration system is also realistically feasible.

The advantages of this invention over other waste disposal methods presently available are numerous and are discussed as follows:

Environmentally Safe

This invention is 100% environmentally safe because it is a completely sealed system operating in the main at a negative pressure. The process does not produce toxic fumes or hazardous fly or bottom ashes. The system does not produce or release any polluting substances to atmosphere or into the ground where they could leach into the water table or be carried to streams and rivers by surface water. Additionally the production of odors is avoided since land filling or composting by-products are not produced by the invention. In summary the invention completely destroys waste without combustion and in doing so makes no impact on the environment rather than disposing of waste through incineration or size reducing it for say landfill.

Inorganic Material Reuse

Inorganic materials of a non-environmental harming composition, such as ferrous and non-ferrous metals, rocks, dirt, etc. are either extracted for re-cycling or if they enter the invention will melt thereafter gradually permeating through the carbon bed in the invention collecting in the base of vessel. In addition to the 'non-environmental harming' inorganic matter the semi-volatile inorganic compounds (SVOC) will also melt and permeate to the base of the vessel. In a liquid state the non-environmental harming inorganics and the SVOC will readily mix and on a periodic basis determined by the level of the molten inorganics be extracted from the ATGR to be vitrified into an inert slag. This inert slag material is 100% safe for reuse in industrial or domestic application.

Other By-Products

Since the invention can process and destroy any type waste (except nuclear waste) other by-products can be produced such as chloride from destruction of plastic as industrial quality salt or, pharmaceutical quality sulphur from the destruction of rubber such as tyres. Where such wastes (plastic and rubber) are destroyed in the by-products are extracted from the invention for use in other industries such as chlorine production and pharmaceutical industries.

The present invention is thus related to a method for producing energy from waste comprising the steps of:
preparing the waste prior to said delivery into said thermal reactor; delivering organic and/or inorganic waste into a thermal reactor;
gasifying any organic fraction of said waste into a syngas containing heat in non-combustion process within the said thermal reactor;
melting any inorganic fraction of said waste in non-combustion process within the said thermal reactor;
generating steam by using said heat contained within said syngas; cleaning and conditioning the said syngas using filtering means; and
using said steam and/or syngas to generate electricity.

The said thermal reactor comprises an internal volume, said internal volume comprising an oxidizing zone located at a lower portion of said internal volume, a carbon bed zone located above said oxidizing zone, a gasification zone located above said carbon bed, and a gas retention zone located above said gasification zone; a heat supply means adapted to supply heat into said oxidizing zone; at least one feed port for delivering said organic and/or inorganic waste into said gasification zone; at least one coke feed port for delivering carbon into said gasification zone whereby said carbon upon entering said gasification zone moves downwards and creates a carbon bed below said gasification zone; at least one exit port for discharge of gas from said gas retention zone, said at least one exit port located at an upper end of said vessel; and at least one slag port for discharge of any molten slag that has collected at a lower portion of said vessel from said apparatus, said at least one slag port located at a lower portion of said vessel. The said gasification of any organic fraction of said waste into a syngas occurs by the thermal action of gasified metallurgic coke, said metallurgic coke created by plasma torches blowing plasma gases onto a coke bed. The coke bed is maintained by the replenishment of carbon from the said at least one coke feed port and a gasification of the said carbon bed by thermal energy from the oxidizing zone. The temperature during the said gasification is between 3000 and 5000° C. The inorganic waste upon entering said gasification zone melts as it falls onto said carbon bed such that it permeates through said carbon bed and falls into said oxidizing zone to exit via at least one said slag port as inert slag.

The preparing of the waste comprises the steps of:
reducing the size of oversized pieces of waste;
crushing the waste;
extracting moisture from the waste;
shredding the waste to a uniform size;
homogenizing moisture content of the waste;
drying and sterilizing the waste in a waste dryer;
extracting predetermined recyclable material; and
storing said waste before said delivery to thermal reactor in a continuously flowing waste stream. The moisture after being extracted from the waste is treated and used in a process and/or cooling medium for the said plant. Sludge produced in the said treatment of moisture is returned to the waste stream. The said drying of waste utilizes heat produced by said plant to generate hot air. The hot air travels through the waste dryer in a counter flow direction to the said waste stream. The recyclable material includes any of metal, earth, stones, and rubber. The delivery of the waste into the thermal reactor is via two waste blending feed hoppers. An internal volume of each feed hopper is maintained in a substantially inert state by purging with nitrogen.

During the steam generation the syngas is channeled to a steam generator via a transfer duct. The said steam generator is able to transfer said heat contained within said syngas to de-mineralised water to produce steam at high pressure. The syngas is at a temperature between 1250-1400° C. before entering said steam generator. Through production of the steam the temperature of the syngas is reduced to below 200° C. prior to exiting said steam generator. The syngas is drawn by an induced draft blower through a fabric bag filter designed to capture particulates within said syngas. The fabric bag filter is periodically cleaned by back-pulsing with nitrogen. The captured particulates are returned to the said thermal reactor for destruction. The syngas is passed through a heat exchanger whereby the temperature of the syngas is reduced to between 150 and 170° C. The syngas is then passed through an activated carbon filter designed to capture volatiles including heavy metals such as mercury, lithium, or cadmium within said syngas. The activated carbon filter is replaced once a saturation point is reached.

Hydrogen Chloride (HCl) is removed from the syngas in an HCl absorber column within which a chloride absorber fluid is circulated. The chloride absorber fluid becomes more acidic as it absorbs chlorides. The chloride absorber column instrumentation senses the change in pH level of the said chloride absorber fluid, such that when the pH level of the said chloride absorber fluid reaches a predetermined pH level, a flow control valve allows fresh chloride absorber fluid to be delivered from an absorber fluid make-up solution system to replace the used chloride absorber fluid. The syngas moves in a counter flow direction to the said chloride absorber fluid inside the said chloride absorber column.

A sulfuric acid removal system is provided and includes a sulfuric acid contactor vessel containing sulfuric acid contactor fluid able to remove sulfuric acid from said syngas; a sulfuric acid regeneration degasser vessel for receiving said contactor fluid after it has absorbed sulfuric acid from the said syngas and substantially removes a hydrogen component of said sulfuric acid from the said contactor fluid; a regeneration surge settler vessel where air is used to agitate the resultant contactor fluid to encourage any remaining sulfuric acid to be removed. An agitator is incorporated in the regeneration surge settler vessel to contain sulfur in the said contactor fluid.

The step of using said steam and/or syngas to generate electricity uses either a gas and steam combined cycle power generation or a steam cycle only power generation.

The combined cycle power generation embodiment comprises the steps of:
compressing said syngas to a pressure of between 2500 to 3500 kPa;
using said syngas as a fuel for a gas turbine, said gas turbine generator able to generate electricity in an electricity generator;
generating steam from exhaust heat of said gas turbine; and
using the steam to generate electricity in a steam turbine and electricity generator.

Steam from the waste heat steam generator is combined with said steam generated from exhaust heat of gas turbine generator before being used in the steam turbine generator.

The steam cycle power generation embodiment comprises the steps of:
generating steam in a pair of steam boilers using said syngas as a fuel; and
using the steam to generate electricity in a steam turbine generator and electricity generator connected to each steam boiler.

This invention also relates to a system for producing energy from waste in a plant comprising: at least one waste blending feed hopper; a thermal reactor designed to receive organic and/or inorganic waste from said feed hopper, said thermal reactor gasifying any organic fraction of said waste into a syngas containing heat and melting any inorganic fraction of said waste in non-combustion processes; a waste heat steam generator for generating steam from a portion of said heat contained within syngas; a cleaning and conditioning module for cleaning and conditioning said syngas; and at least one electricity generating module for generating electricity by using the syngas as a fuel.

The said thermal reactor comprises an internal volume, said internal volume comprising an oxidizing zone located at a lower portion of said internal volume, a carbon bed located above said oxidizing zone, a gasification zone located above said carbon bed, and a gas retention zone located above said gasification zone; a heat supply means adapted to supply heat into said oxidizing zone; at least one feed port for delivering said organic and/or inorganic waste into said gasification zone; at least one coke feed port for delivering carbon into said gasification zone whereby said cartoon upon entering said gasification zone moves downwards and creates a carbon bed below said gasification zone; at least one exit port for discharge of gas from said gas retention zone, said at least one exit port located at an upper end of said vessel; and at least one slag port for discharge of any molten slag that has collected at a lower portion of said vessel from said apparatus, said at least one slag port located at a lower portion of said vessel. The said gasification of any organic fraction of said waste into a syngas occurs by the thermal action of gasified metallurgic coke, said gasification of metallurgic coke is created by plasma torches delivering high temperature plasma gases into said oxidizing zone below the coke bed. The coke bed is maintained by the replenishment of coke from at least one coke feed port and a gasification of the said carbon bed by thermal energy from plasma gas delivered into the oxidizing zone. The temperature during the said gasification varies between 3000 and 5000° C. The inorganic waste upon entering said gasification zone melts as it falls onto said carbon bed such that it permeates through said carbon bed and falls into said oxidizing zone to exit via at least one said slag port as inert slag.

A waste preparation module is provided for preparing the 'raw' waste prior to delivery into said thermal reactor comprising an oversized waste size reducer for reducing the size of oversized pieces of waste; a waste crusher for crushing said waste and removing moisture from said waste; a waste shredder for shredding the waste into uniform sized portions; a waste moisture homogenizer for homogenizing the moisture content of the waste; and a waste dryer for extracting moisture from the waste whereby the waste moves in a continuously flowing stream. The moisture removed from the waste as leachate in the said waste crusher is treated and used as a process and/or cooling medium in the said plant. Sludge produced in the said treatment of moisture is returned to said waste stream for destruction. The waste dryer utilizes heat produced by said plant to generate hot air. The hot air travels through said waste dryer in a counter flow direction to the said waste stream. A recycle extraction module is provided for extracting recyclable material from the said waste stream. The recyclable material includes any of the metal, earth, stones, and rubber. A storage area is provided for storing prepared waste so that said waste may be retrieved as needed. The waste is delivered into the thermal reactor via two waste blending feed hoppers. An internal volume of each said feed happens maintained in a substantially inert state by purging with nitrogen.

The waste heat steam generator uses a majority of said heat in the syngas to convert de-mineralised water into high pressure steam. The syngas is at a temperature between 1250-1400° C. before entering said waste heat steam generator. The syngas is at a temperature below 200° C. after exiting said waste heat steam generator. The cleaning and conditioning module comprises a fabric bag filter designed to capture particulates within said syngas. The fabric bag filter is periodically cleaned by back-pulsing with nitrogen. The captured particulates are returned to the said thermal reactor for destruction. The cleaning and conditioning module also comprises a gas/gas recuperator heat exchanger through which the syngas is passed, and where the temperature of the syngas is reduced to between 150 and 170° C. The cleaning and conditioning module further comprises a second, activated carbon filter designed to capture volatiles and/or heavy metals such as mercury, lithium, or cadmium within said syngas. This activated carbon fitter media is replaced once the saturation point of the activated carbon is reached. The cleaning and conditioning module also comprises a Hydrogen Chloride (HCl) absorber column for removing chlorides from said syngas, said HCl absorber column including a chloride absorber fluid circulated therein. The chloride absorber fluid becomes more acidic as it absorbs chlorides. The chloride absorber column is able to sense the pH level of the said chloride absorber fluid, such that when the pH level of the said chloride absorber fluid reaches a predetermined level, a flow control valve allows fresh chloride absorber fluid to be delivered from an absorber fluid make-up solution system into the chloride absorber column. The syngas moves in a counter flow direction to the chloride absorber fluid inside the chloride absorber column.

The cleaning and conditioning module further comprises a sulfuric acid removal system that includes a sulfuric acid contactor vessel containing sulfuric acid contactor fluid, said sulfuric acid contactor fluid able to remove sulfuric acid from said syngas; a sulfuric acid regeneration degasser vessel for receiving said contactor fluid after it has absorbed sulfuric acid from the said syngas and substantially removes a hydrogen component of said sulfuric acid from the said contactor fluid; and a regeneration surge settler vessel where air is used to agitate the resultant contactor fluid to encourage any remaining sulfuric acid to be removed. An agitator is incorporated in the said regeneration surge settler vessel to contain sulfur in the said contactor fluid.

The electricity generating module is either one of a gas and steam combined cycle power generation module or a steam cycle only power generation module.

The combined cycle power generation module comprises: a gas turbine that uses said syngas as a fuel, said gas turbine generator able to run an electricity generator to generate electricity; a steam generator that uses heat produced by said gas turbine to generate steam; and a steam turbine that uses steam from the said steam generator, said steam turbine able to run an electricity generator to generate electricity. Steam from the waste heat steam generator is combined with said steam from the said steam generator before being used in the steam turbine.

The steam cycle power generation module comprises: a pair of steam boilers that uses said syngas as a fuel; one steam turbine connected to each steam boiler, said steam turbine using steam from the said steam boiler to run an electricity generator to generate electricity.

The above described method and system incorporate an emission control system that monitors the levels of elements including any of: nitrogen oxide, sulfur oxide, carbon dioxide, dioxin, and furan.

Other objects and advantages will be more fully apparent from the following disclosure and appended claims.

DETAILED DESCRIPTION OF INVENTION

Figure 1:
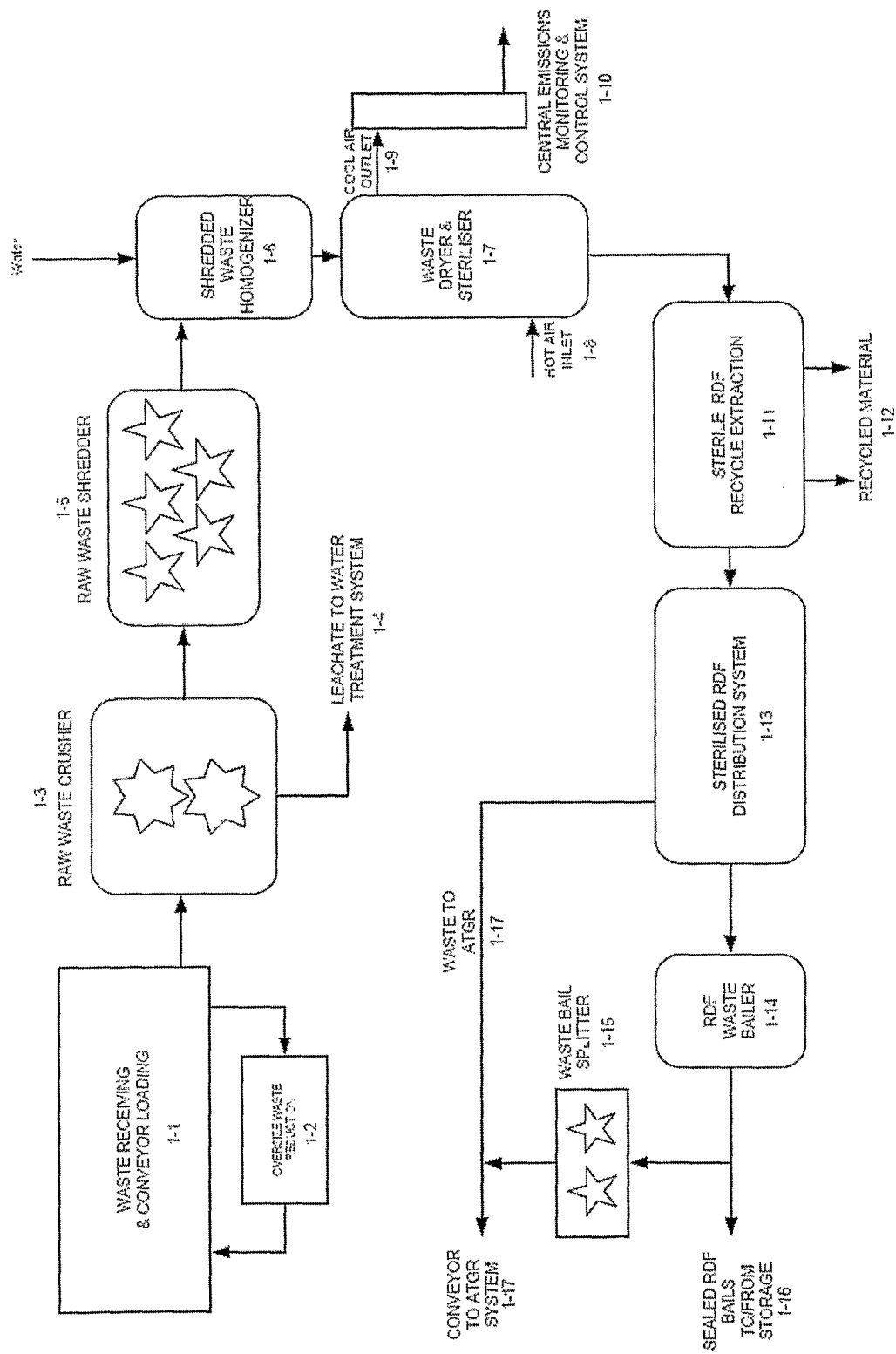
FIG. 1 shows a diagrammatic view of a first stage in an embodiment of this invention.

It should be noted that the following detailed description is directed to a method and system for producing heat energy by destroying waste and is not limited to any particular size or configuration but in fact a multitude of sizes and configurations within the general scope of the following description.

Stage 1—Waste Receiving, Sorting and RDF Production

This stage will be described in reference to FIG. 1 and FIG. 2. Waste delivered to the plant is initially checked for oversized components [1-1]. Oversized items are extracted from the main stream and size reduced [1-2] before being returned to the main waste input stream [1-1]. The raw waste is then crushed [1-3] and moisture is extracted from the waste and after being treated is used as process and cooling water within the plant [1-4]. Sludge produced in the treatment of the moisture extracted from the waste is returned to the waste stream for destruction in a reactor (2-4). After crushing, the waste is shredded to obtain a uniform size [1-5] to encourage final moisture extraction in the waste dryer [1-7]. After shredding the waste is fed to a moisture homogeniser [1-6] and a small quantity of water added to the waste to encourage hydroscopic material in the waste to be homogeneous in its moisture content prior to entering the waste dryer [1-7]. From the shredded waste homogeniser [1-6] the waste is conveyed to the waste dryer and steriliser [1-7] and fed through, on a continual basis. The heat source for drying the waste comes from a hot air generator which uses the sensible heat from flue gas taken from the plant's parasitic load generation system. Hot air enters the drier [1-7] at the outlet end of the drier [1-8] thus maximizing the heat transfer through counter flow with the waste stream thereby maximising moisture extraction. The cooler moisture laden air [1-9] exits the drier [1-7] and is discharged to atmosphere via a central emissions monitoring and control system [1-10]. The dry waste is conveyed to a Sterile refused derived fuel (RDF) Recycle Extraction [1-11] where pre-programmed selected material e.g. metal, earth, stones, rubber etc. is extracted [1-12] for recycling. After extraction of the selected recyclable material the waste, which is now sterile RDF, is collected in a distribution system [1-13] and conveyed to the reactor. In order to ensure sufficient feedstock is available a portion of the waste in the distribution system [1-13] is sent to a bailer [1-14] where it is bailed and thereafter sent to a storage area [1-16]. The RDF (refused derived fuel) leaving the distribution system [1-13] is conveyed by a sealed nitrogen vented conveyor [1-17] to the reactor [2-4] waste receiving hoppers [2-1]. When the stored RDF is required the balls are recovered from the storage area [1-16] and via a ball splitter [1-15] are conveyed to the sealed nitrogen purged conveyor [1-17] for onward conveying to the reactor [2-4] waste receiving hoppers [2-1].

Stage 2—Organic Waste Gasification and Inorganic Waste Vitrification

Figure 2:
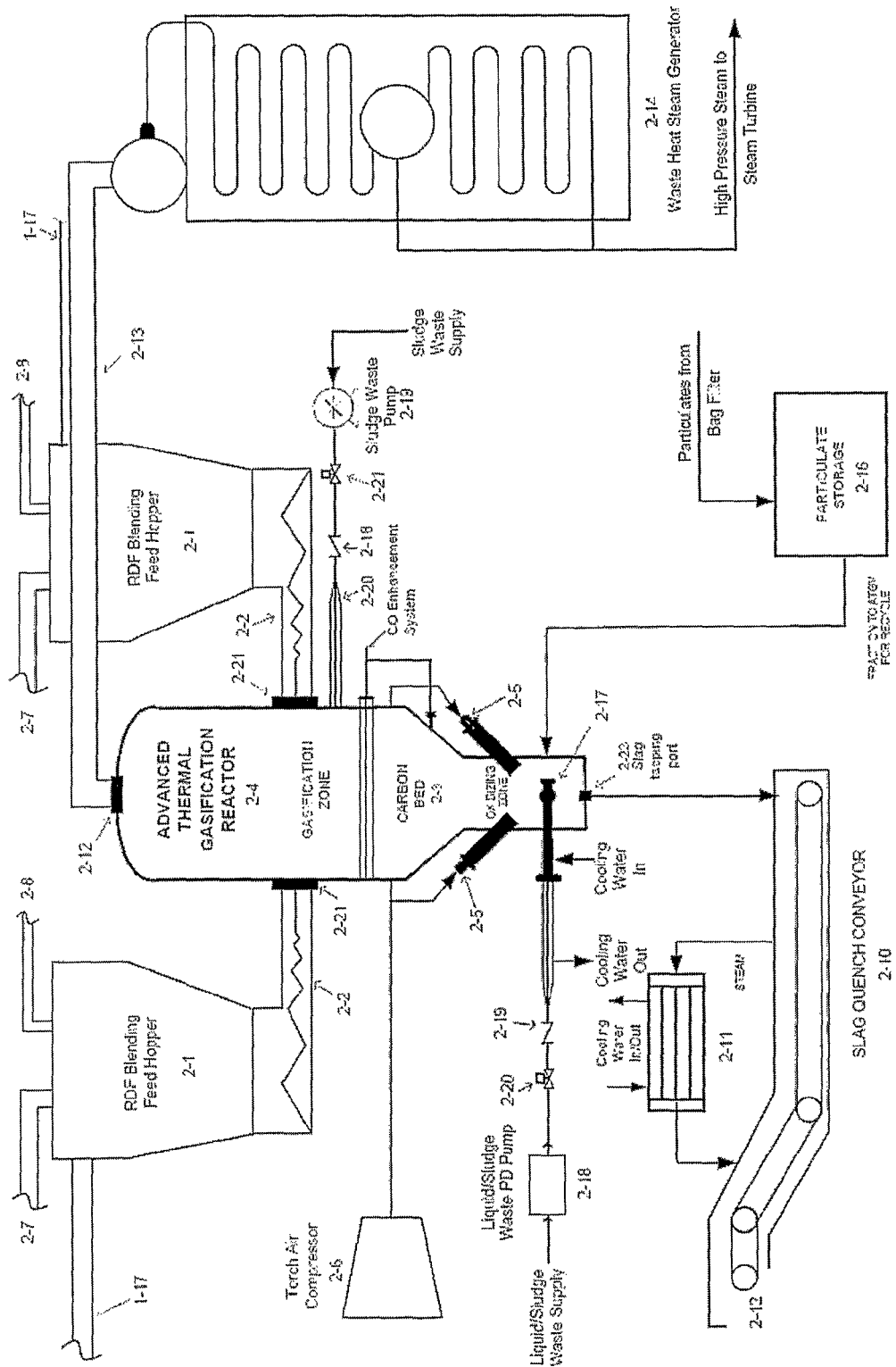
FIG. 2 shows a diagrammatic view of a second stage in an embodiment of this invention.

Now referring mostly to FIG. 2 but also to FIG. 1, the RDF is conveyed from the RDF distribution system [1-13] or the storage area [1-16] in the sealed conveyor [1-17] and is fed simultaneously to the two RDF blending feed hoppers [2-1]. The RDF blending feed hoppers [2-1] are continually purged with nitrogen. Continual purging of the receiving hoppers [2-1] ensures the environment inside each hopper is as inert as possible. In addition to RDF being fed into the RDF blending feed hoppers [2-1] metallurgic coke and lime is also fed from a supply silos via sealed conveyors [2-7] and [2-8] respectively into the top of the RDF blending feed hoppers. At the base of each RDF blending feed hopper [2-1] is a vertical rotary feeder that grabs the RDF, metallurgic coke and lime mix and deposits this into a horizontal screw feeder [2-2]. Each horizontal screw feeder [2-2] is housed in a conical water cooled housing and as the horizontal screw feeder moves the RDF forward a slight compression is realised which has the effect of 'squeezing' any remaining nitrogen, and possibly air, out of the RDF, metallurgic coke and lime mix prior to it entering the gasification reactor [2-4].

Two RDF feed ports and slam shut ESD gate valves [2-21] are located on opposing sides of the reactor each of which includes sensory arrays to continually monitor for flame-back. In the event combustion is detected at the interface of the screw feeders [2-2] and the reactor [2-4] the sensors will detect this and activate slam-shut gate valves [2-21] to ensure the combustion is contained in the reactor [2-4] and does not flame back to the RDF blending feed hoppers [2-1]. The RDF entering the reactor is immediately subjected to a sub-stoichiometric environment at a temperature$\geq$3000° C. in which the organic faction in the RDF gasifies. The metallurgic coke contained in the RDF stream falls on to an existing carbon bed [2-3] ensuring the carbon bed in the reactor [2-4] is maintained at the required level below the CO enhancement system [2-22]. Maintenance of the carbon bed [2-3] is fundamental to the stable operation of the reactor, distribution of thermal energy into the gasification zone and sustaining the sub-stoichiometric environment above the carbon bed. The carbon bed [2-3] continually gasifies but at a slower rate than the RDF, consequently the rate at which the metallurgic coke is fed to the reactor is a function of the reactor's operating temperature which is continually monitored and the metallurgic coke feed rate is automatically adjusted against this in real time. The lime fed in with the RDF is maintained at a flow rate proportional to the RDF being fed from the RDF Distribution System [1-13], on entering the reactor the lime melts as it falls onto the carbon bed and permeates through it falling into the base of oxidizing zone of the reactor [2-4]. Lime is added to the process for stabilizing the molten slag in a liquid form prior to it being tapped from reactor. The inorganic faction of the RDF also melts on entering the reactor as it falls onto the carbon bed [2-3] and this too permeates through it falling to the base of the oxidizing zone of the reactor. The lime and inorganic faction of the RDF combine as a molten slag in the base of the reactor [2-4] and by gravity will exit the reactor as a molten slag via a purpose designed molten slag tapping port [2-23]. The molten slag having a lava appearance flows by gravity into a slag quench conveyor [2-10] which is approximately two thirds full of water, the molten slag on making contact with water immediately vitrifies into a glassy in appearance type material. The vitrified slag falls to the base of the slag quench conveyor [2-10] and is captured by a drag chain conveyor that pulls the vitrified slag through water in order to; a) Cool it and b) Eventually discharge it at [2-12] into a receiving, vessel for transportation to other users.

The slag on entering the water will generate steam at atmospheric pressure and this steam is drawn through a steam condenser [2-11] for condensing to be recycled back into the slag quench conveyor [2-10] thus minimising make-up water.

The organic fraction of the RDF gasified in the reactor [2-4] and forms a syngas which rises up through the vessel as a function of its own thermal energy plus a negligible assistance derived from an induced draft blower [3-5] located downstream of the activated carbon filter [3-6]. The design capacity of the induced draft blower, coupled with the syngas retention section in the reactor [2-4], results in the exit velocity of the syngas being <3 m/s. The operating pressure in the reactor [24] is maintained at <1 bara. Retention of the syngas in the reactor is effected for two purposes;

a) To provide time for the RDF organic fraction to completely gasify and the inorganic fraction to melt, to ensure carryover of particulates are mitigated to a level that is negligible, if not, non-existent;
and
b) To provide a retention period for the syngas to 'naturally' cool to a temperature that will be $\leq$1400° C. before it exits the reactor at the top [2-12].

The thermal energy necessary for gasification of the organic fraction and melting of the inorganic fraction of the RDF is provided from three or more plasma torch systems, which due to their variable operating characteristics will allow the necessary thermal energy to be produced from one or more of the installed plasma torch systems [2-5]. The plasma torch systems are located in the oxidizing zone of the reactor [2-4]. Each plasma torch, when operational, is supplied with compressed air, which may or may not be heated and/or enriched with oxygen having a purity$\geq$93%. Each operational plasma torch will generate plasma gas that is discharged from the torches at a temperature>6000° C. into the oxidizing zone of the reactor which exists below the carbon bed [2-3]. The thermal energy from the plasma gas confined in the oxidizing zone percolates up through the carbon bed and in doing so free oxygen ($O_2$) molecules in the plasma gas bond with carbon molecules (C) to form carbon monoxide (CO). The thermal energy from the plasma gas initially transfers by an endothermic reaction into the carbon bed and this transfer of energy in to the carbon bed effects a temperature reduction of the plasma gas thermal energy through the gasification of the carbon.

As the carbon gasifies an exothermic reaction is established which effectively creates a catalytic reaction i.e. the gasification of the carbon provides the thermal energy at a constant rate irrespective of the variable thermal energy output from the plasma torches. To ensure the exothermic reaction is sustained the carbon mass is continually maintained relative to the mass of RDF being destroyed. The temperature of the thermal energy being released from the carbon bed and passing into the gasification zone of the reactor [2-4] is $\leq$5000° C.

Each plasma torch systems can be adjusted from its maximum down to 30% of full capacity, providing a level of flexibility in the production of thermal energy that permits the reactor to operate with a 30% turndown ratio if the quantity of RDF being fed is reduced. This flexibility also permits operation of the reactor at lower temperatures thus conserving energy without the need to shutdown consequently avoiding the extensive temperature variations and associated contractions/expansions associated with the starting up and shutting down of a thermal process.

The free oxygen and carbon having bonded to form CO, and due to the absence of air in the gasification zone of the reactor [2-4], gasification of the RDF occurs in a sub-stoichiometric environment thus avoiding any combustion. Additionally, because of the extreme temperature profile in the reactor, destruction of the waste is achieved by thermal depolymerization/gasification i.e. the breakdown by disassociation of the molecular structure of the various components of the RDF.

The depolymerization/gasification process of the RDF ensures the maximum amount of available energy as a syngas is recovered from the waste for use in other processes once the syngas has been cooled, cleaned and conditioned. Further; since there is insufficient air to sustain combustion, even though $C_6$ benzene rings and Cl are likely to be present in the syngas, the formation of furan or dioxin is avoided.

After the syngas has been retained in the reactor [2-4] it will exit at the top via the reactor syngas outlet [2-12] and thereafter via a transfer duct [2-13] enters a purpose designed waste heat steam generator [2-14]. The temperature of the syngas entering the waste heat steam generator [2-14] will be in the range of ~1250-1400° C. The waste heat steam generator [2-14] is a purpose designed heat transfer system that will recover the sensible heat from the syngas and in doing so transfer the sensible heat to de-mineralised water to generate high pressure steam which will be used for increasing the amount of electrical power produced by the steam turbine generator [T5-4] in the combine cycle power generation system, or the steam turbine generators [B5-4 and B5-5] in the steam cycle power generation system.

The syngas entering the waste heat steam generator [2-14] will, as a result of giving up the major portion of its sensible heat, have its temperature reduced to <200° C. which avoids the need for high grade and expensive alloy materials of construction in the syngas processing equipment.

The syngas on being discharged from the waste heat steam generator [2-14] is drawn by the induced draft blower through a fabric (bag) filter [3-3], the purpose of which is to capture particulates that may have possibly been carried over with the syngas from the reactor [2-4]. If such particulate exists, it will be collected on the filter media and the filter media (bags) are periodically cleaned by back-pulsing with nitrogen. The collected particulate matter will fall to the bottom of the bag filter [3-3] into a particulate collection conveyor [3-3a]. This conveyor is sealed and conveys the particulate to a particulate sealed storage tank [2-16]. Particulate collected in this way will be returned to the reactor [2-4] on a campaign basis for melting and thereafter vitrifying in the slag quench conveyor [2-10].

The plant of this invention also has the capability of destroying liquid waste or sludge. In the event either of these two waste forms are delivered for destruction they would be delivered separately to the reactor [2-4] via a purpose designed sludge/liquid injection nozzle [2-17]. The liquid/sludge waste is injected by a positive displacement pump [2-18] into the oxidizing zone where will immediately vaporizes on entering the reactor and as a result is transformed to a syngas.

Liquid/Sludge waste is delivered under pressure from the positive displacement pump [2-18] via a non-return valve [2-19] to a water cooled nozzle [2-17] manufactured from high grade ceramic material. Located upstream, of the nozzle is a shutdown valve [2-20] that will close automatically in the event of an emergency shut-down. The syngas from the liquid/sludge waste entrains with the plasma gas and percolates through the carbon bed. The syngas from the liquid/sludge waste immediately joins the syngas from the organic faction of the RDF.

Stage 3/1—Syngas Gleaning and Conditioning

Figure 3A:
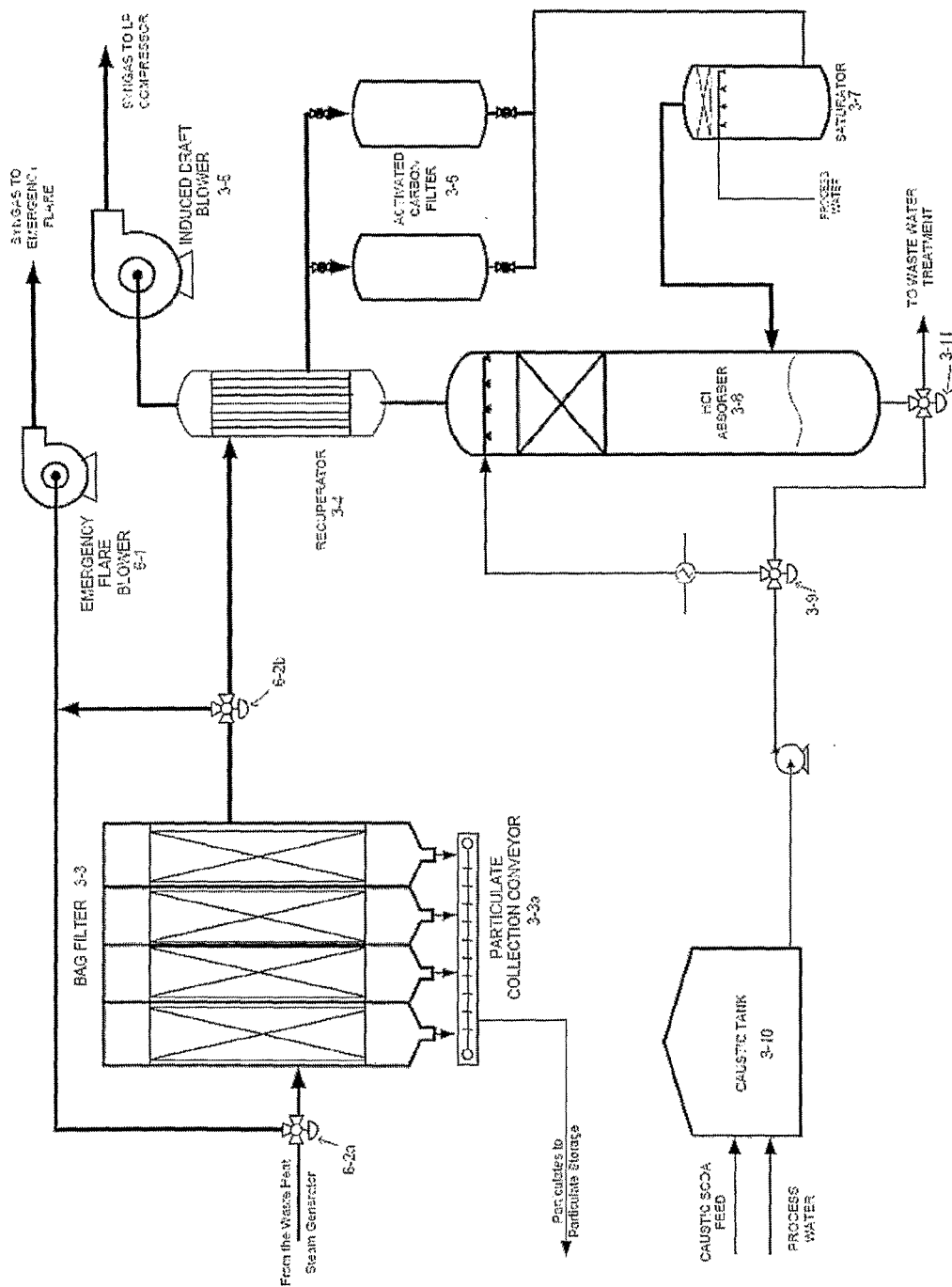
FIGS. 3a and 3b shows diagrammatic views of a third stage in an embodiment of this invention.
Figure 3B:
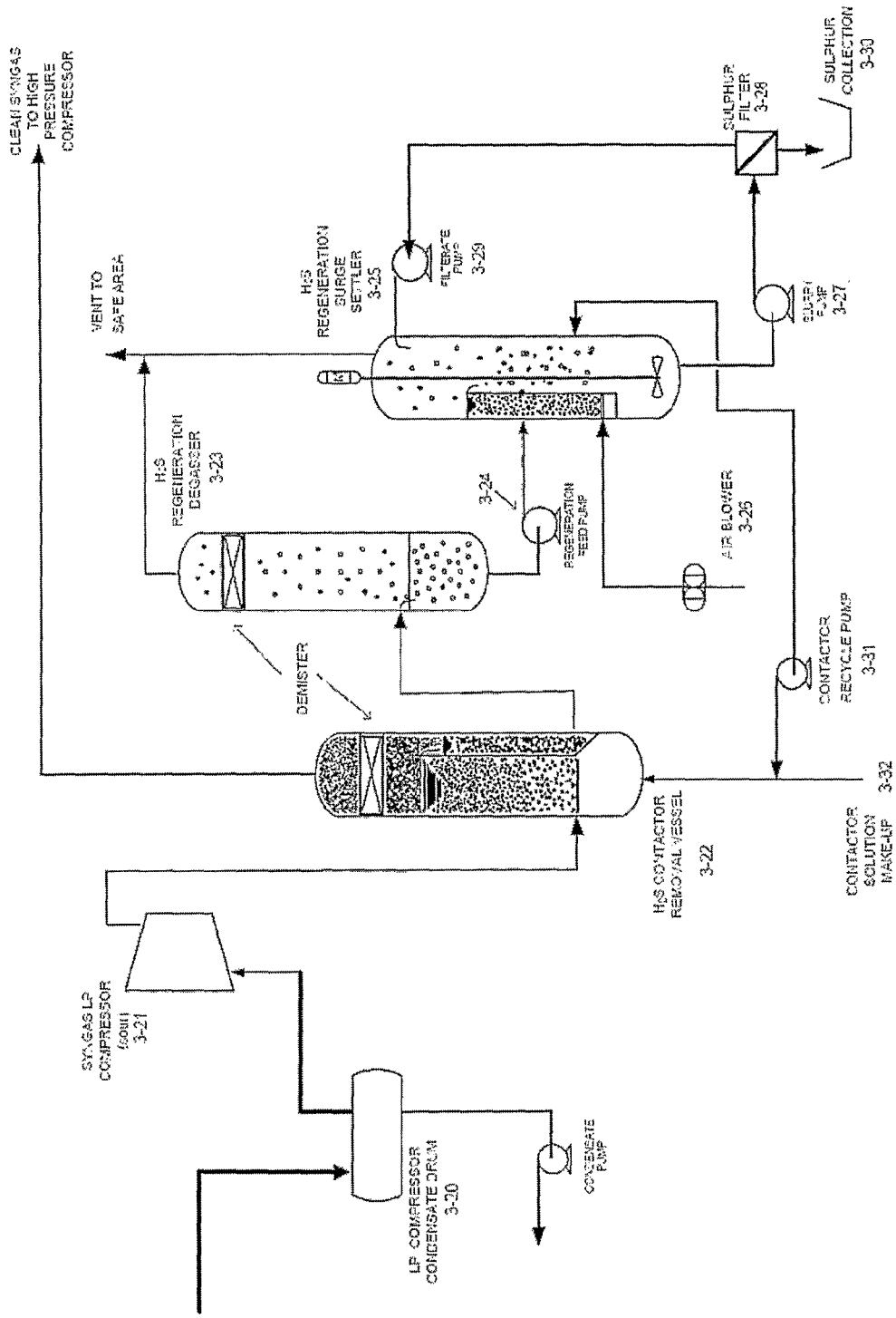

Now referring to FIGS. 2, 3a, and 3b, the syngas exits waste heat steam generator [2-14] and is drawn through a self cleaning bag filter [3-3]. The bag filter is provided to collect any particulates that may have passed through syngas waste heat steam generator [2-14]. The bag filter [3-3] is utilized in the plant to ensure the syngas will be particulate free. Particulate collected in the bag filter [3-3] are removed by back-pulsing the filter bags with nitrogen causing the particulate to fall in to a sealed particulate collection conveyor [3-3a]. This conveyor returns the particulates to the sealed particulate storage tank [2-16]. Particulates collected from the bag filter [3-3] will be returned to the reactor [2-4] on a campaign basis for melting and thereafter vitrifying in the slag quench conveyor [2-10].

The syngas, now particulate free and with a maximum temperature of 200° C., is drawn by the induced draft blower [3-5] through the shell side of a gas/gas recuperator heat-exchanger [3-4] where its temperature is reduced to ~180° C. before entering a dual, duty/standby, activated carbon filter [3-6], the activated carbon filter captures volatiles e.g. Mercury (Hg), Lithium (Li), Cadmium (Cd), likely to be found in waste, especially municipal waste. As the syngas passes through the activated carbon filter [3-6] any volatile heavy metals produced at the time the RDF is gasified in the reactor [2-4] are captured by the activated carbon and consequently removed from the syngas. The duty activated carbon filter is continually monitored and when the saturation point of the activated carbon fitter is almost reached the duty fitter will be taken off-line and the stand-by filter put on-line as the duty filter. The saturated activated filter media in a cartridge form is removed and replaced with a 'clean' filter cartridge and immediately returned to service as the stand-by activated carbon filter. The extracted filter cartridge is sealed for transportation to be solidified and thereafter sent for secure disposal.

After the syngas leaves the duty activated carbon fitter [3-6] it is discharged into a saturator [3-7] up-stream of an HCl absorber system [3-8]. The syngas is saturated with water to; a) reduce the temperature of the syngas to that of the HCl absorber fluid thereby making it susceptible to having chlorides absorbed from the syngas thus making the HCl absorber column [3-8] more efficient. A chloride absorber fluid, typically Sodium Hydroxide (NaOH), is circulated through the HCl absorber column [3-8] and as the absorber fluid becomes saturated with chlorides from the syngas the pH will decrease, this change in pH is sensed by a flow controller which in turn opens a flow control valve [3-9] to allow fresh absorber fluid to be delivered from the absorber fluid make-up solution system [3-10] in to the absorber column. This additional absorber fluid will increase the level of the absorber fluid/water mixture contained in the base of the column and this increase in level will be sensed by a level controller. This controller will open a flow control valve [3-11] allowing the denser spent absorber fluid to flow to plant waste water treatment system. As the specific gravity of the saturated absorber fluid increases it becomes denser than the 'clean' absorber fluid/water mixture being circulated in the HCl absorber column [3-8], the denser absorber fluid it will sink to the bottom of the HCl absorber column [3-8] and therefore only saturated absorber fluid is drawn out of the HCl absorber column while the mix of absorber fluid/water is introduced to adjust to the required pH.

The syngas will pass contra flow to the absorber fluid in the HCl absorber column [3-8] and after passing through a demister [3-12] housed in the HCl absorber column [3-8] the syngas is drawn out of the HCl absorber column by the suction of the syngas low pressure compressor [3-21] located downstream of the absorber column.

The syngas leaving the HCl absorber column will be drawn through the tube side of the recuperator [3-4] where its temperature will be increased to ~132° C. by the syngas passing through the shell side prior to being delivered to the low pressure compressor [3-21].

Stage 3/2a—Syngas Emergency Flare

During the filtering and cleaning of the syngas provision is made for evacuating the syngas in the event an emergency arises. Upstream of the and downstream of the bag filter [3-3] are two emergency by-pass valves [6-2a] and [6-2b] that once activated will close the normal syngas flow path and simultaneously open the flow lines to the emergency flare. An emergency flare blower [6-1] is provided on the upstream side of the emergency by-pass valves [6-2a] and [6-2b] which will automatically start in the event of an emergency alarm and the emergency flare blower [6-1] will divert all syngas flow to the emergency flare. The flaring of syngas will only be effected in times of emergency and once an emergency is activated the plasma torch systems [2-5] are immediately shutdown thus removing the source of thermal energy production. There will however be residual thermal energy in the reactor [2-4] and so production of syngas in an emergency is also prevented by stopping the feed of RDF to the reactor [2-4]. To stop the feed of RDF slam-shut gate valves [2-21] located at each of the RDF inlet ports of the reactor [2-4] will fail close, simultaneously the emergency shut-down valve [6-2a & 6-2b] open to allow syngas to the emergency flare. The effect of the actions discussed above isolates equipment upstream of the reactor and equipment located upstream and downstream of the bag filter 3-3. By isolating the reactor [2-4] from the RDF blending feed hoppers [2-1] the source for further syngas production is eliminated.

The action of emergency shut-down valves [6-2a] and [6-2b] opening to the emergency flare, stops the flow of syngas to all equipment-located downstream of the valve, any syngas remaining in the downstream process equipment i.e. compression and power generation equipment, will be rapidly consumed by the power generation system [Stage 5] which will itself shutdown automatically as it becomes starved of fuel (syngas).

Stage 3/2b Low Pressure Compression & $H_2S$ Removal

Under normal operating conditions the syngas having been cooled, filtered and cleaned is drawn though the remaining GreenTech ATGS equipment by the suction of the low pressure compressor [3-21], before entering the low pressure compressor suction the syngas passes through a condensate knock-out drum [3-20] condensate collected in this drum is returned to the plant's water treatment system for recycling to the process water make-up system. The syngas leaves the condensate knock-out drum at a pressure of ~0.7 barg and is compressed in the syngas low pressure compressor [3-21] to ~10 barg. The increase in pressure of the syngas is necessary to ensure sufficient pressure exists in the syngas to enable it to overcome pressure losses that will be experienced in the $H_2S$ removal system [3-21 to 3-32] if installed. In any event the discharge of the syngas low pressure compressor [3-21] will be sized to suit the required net positive suction head (NPSH) of the syngas high pressure compressor [4-2] when the demand for a high deliver pressure is required e.g. when a gas turbine generator is used.

In situations where the raw waste includes an amount of rubber likely to cause the percentage of $H_2S$ in the syngas to exceed 6% v/v on a regular basis it will be necessary to included an $H_2S$ removal system in the plant's design. If the plant is not designed to process rubber the $H_2S$ removal system will be excluded and rubber products e.g. tyres will be extracted at the Waste Receiving area [1-1], alternatively rubber products can be shredded and extracted at the Sterile RDF Recycling Extraction [1-11].

Specifically for this plant, if the syngas is likely to contain $H_2S$ exceeding 6% v/v, the syngas will be discharged from the syngas low pressure compressor [3-21] to the inlet of an $H_2S$ contactor removal vessel [3-22] and the syngas will percolate through the $H_2S$ contactor fluid being cycled through the $H_2S$ removal system. The syngas will break-out of solution from the contactor fluid and after passing through a demister incorporated in the $H_2S$ contactor removal vessel [3-22] the syngas, now free of sulphur, will be discharged to the syngas high pressure compressor inlet [4-2].

The sulphur rich contactor fluid being cycled through the contactor removal vessel flows over a weir in the contactor vessel [3-22] and by the contactor regeneration degasser feed pump [3-24] is drawn into the $H_2S$ re-generation degasser vessel [3-23]. This transfer of the contactor solution from the H2S contactor removal vessel [3-22] to the regeneration degasser vessel [3-23] provides for any remaining hydrogen still in the contactor solution to break out and be vented to a safe area. The regeneration feed pump [3-24] draws the sulphur rich contactor fluid from the regeneration degasser vessel [3-23] and discharges it to the $H_2S$ regeneration surge settler vessel [3-25]. As the sulphur rich contactor fluid enters the re-generation surge settler vessel [3-25], air is delivered from an air blower [3-26] which agitates the mixture and encourages any $H_2S$ remaining in solution to break-out of solution to be vented to a safe area. The contactor solution now resembles a sulphur rich slurry. In order to ensure the sulphur remains in solution with the contactor fluid an agitator is incorporated in the regeneration surge settler vessel [3-25].

The slurry solution pump [3-27] removes the agitated slurry from the bottom of the regeneration surge settler vessel [3-25] and delivers it to a sulphur filter [3-28] where the sulphur is separated in the filter from the contactor fluid which results in a sulphur cake. This sulphur cake is deposited directly in to a mobile receiving vessel [3-30]. The contactor solution meanwhile is returned to regeneration surge settler vessel by a filtrate pump [3-29] where it is drawn of from this vessel and returned back to the $H_2S$ contactor removal vessel [3-22]. As the contactor fluid is depleted by the small portion left in the sulphur cake, make-up contactor fluid is provided from a contactor fluid supply [3-32].

Stage 4—SynGas Compression & Conditioning

Figure 4:
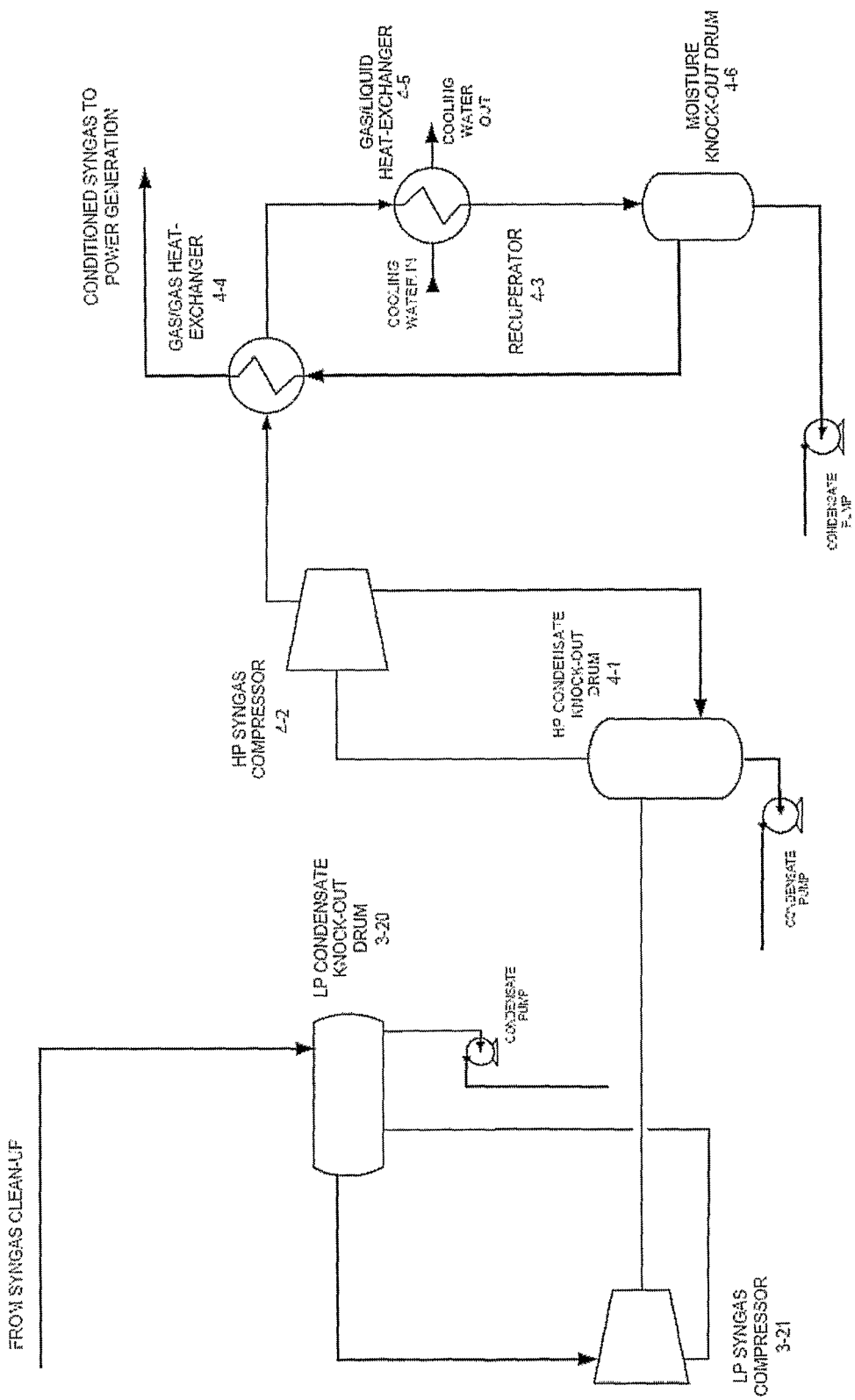
FIG. 4 shows a diagrammatic view of a fourth stage in an embodiment of this invention.

Now referring to FIG. 4, in the event $H_2S$ is not required the equipment and process described above [3-22 thru 3-32] will not be provided in which case; after the syngas has passed through the tube side of the recuperator [3-4] depending on whether the power generation system is combine gas and steam cycle, or steam only cycle the following will apply;

For Combine Cycle:

The syngas will be drawn into the suction of the low pressure compressor [3-21] after passing through an LP condensate knock-out drum [3-20]. The syngas leaves the condensate knock-out drum at a pressure of ~0.7 barg and is compressed in the syngas tow pressure compressor [3-21] to ~5 barg. This increase in pressure of the syngas is necessary to provide an economical net positive suction pressure head (NPSH) for the high pressure syngas compressor [4-2]. Before entering the high pressure syngas compressor [4-2] the syngas passes through the high pressure condensate knock-out drum [4-1] and moisture collected here is also returned to the plant's water treatment system for recycling to the process water make-up system.

The syngas on passing through the high pressure compressor [4-2] is compressed to ~30 barg. This pressure will vary depending on the ultimate inlet pressure required by the gas turbine generator [T5-2]. In any event sufficient pressure will be developed to provide the required inlet pressure at the gas turbine generator combustion system.

For Steam Cycle:

The syngas will be drawn into the suction of the low pressure compressor [3-21] after passing through an LP condensate knock-out drum [3-20]. The syngas leaves the condensate knock-out drum at a pressure of ~0.7 barg and is compressed in the syngas low pressure compressor [3-21] to ~5 barg. This increase in pressure of the syngas is necessary to provide an economical positive delivery pressure required to ensure the burner in the steam boilers will remain operational i.e. it will not 'flame out'. The syngas will pass through a moisture knock-out drum [5-1] prior to being delivered to the boiler burners and moisture collected here is returned to the plant's water treatment system for recycling to the process water make-up system.

Stage 5—Power Generation Systems.

Figure 5A:
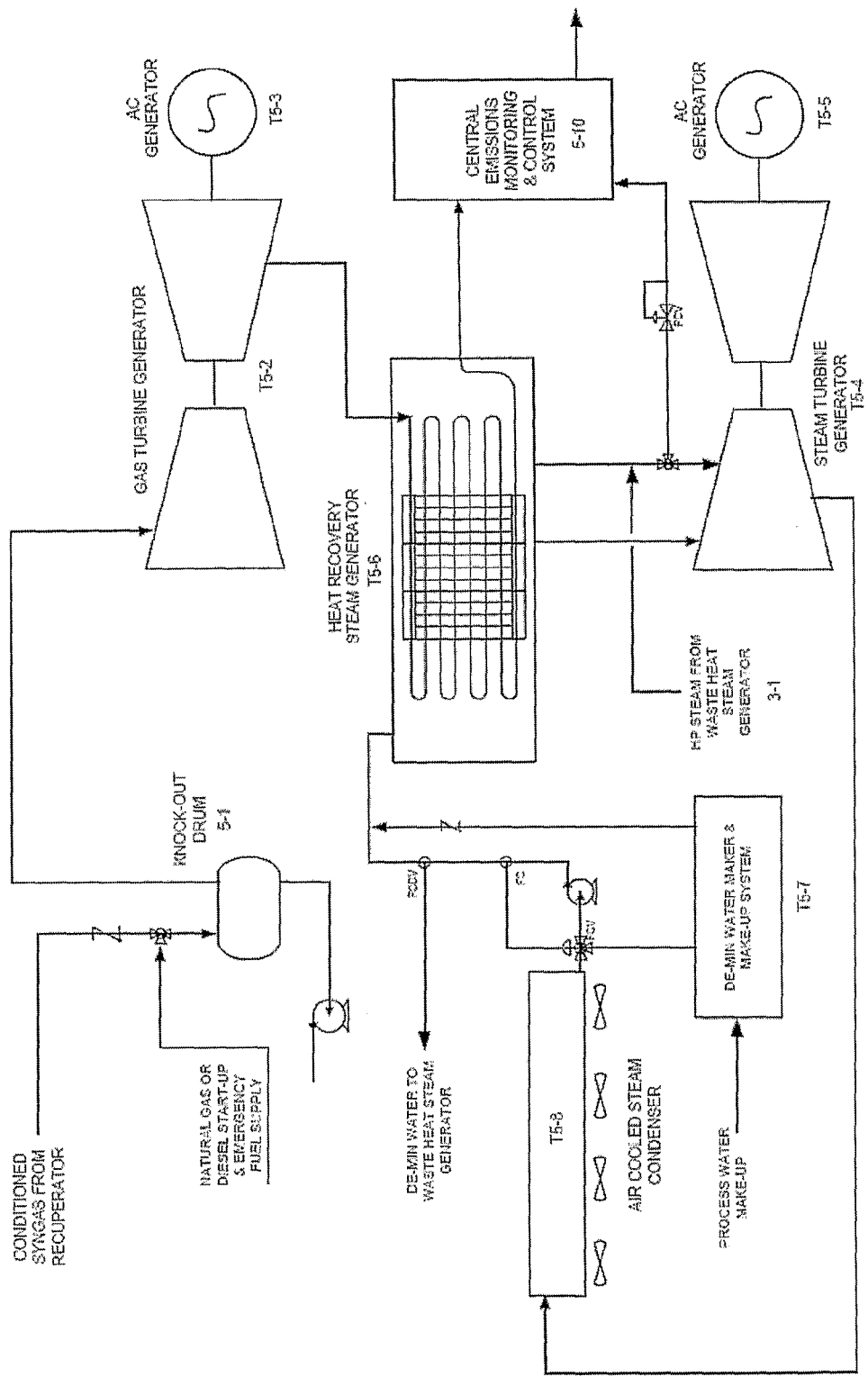
FIG. 5a shows a diagrammatic view of a fifth stage in an embodiment of this invention.
Figure 5B:
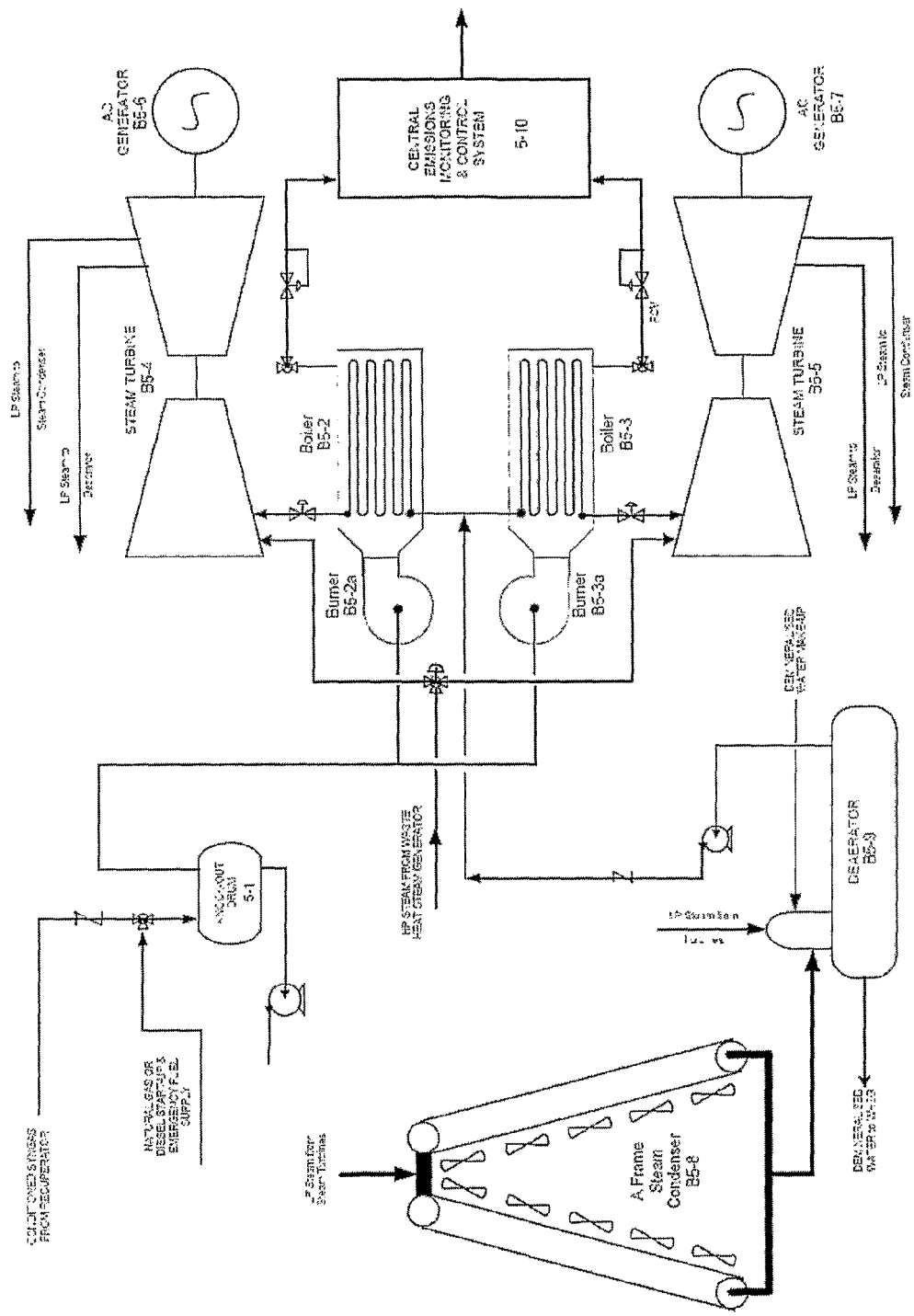
FIG. 5b shows a diagrammatic view of a fifth stage in another embodiment of this invention.

Now referring to FIGS. 5a and 5b, this invention is designed to provide maximum flexibility, not only in its ability to destroy any type of waste (excluding nuclear waste) and converting the waste's organic faction to energy, but in the system's ability to use the energy in the syngas to generate power by either a gas turbine in combine cycle or steam boilers for use in steam turbines. The following describes how these two methods of generating power are adopted to be suitable for this invention.

Stage 5a—Combine Cycle Power Generation System

The syngas after being conditioned in the recuperator [4-3] is delivered to a moisture knock-out drum [5-1] as a Final stage of protection for moisture removal before the syngas is delivered to a gas turbine generator package [T5-2]. The gas turbines used in this plant are modified for use with syngas to ensure stability in the turbines combustion system remains stable within a band defined by the syngas's calorific value. The syngas, having been treated in the previously discussed syngas cooling, cleaning and conditioning systems, is used as a fuel to fire the gas turbine as the prime mover for driving an electrical generator [T5-3]. The amount of electrical energy (MWe) that will be produced by this electrical generator will depend on several factors being:

a) the amount of solid/liquid waste to be destroyed
b) the moisture content of the waste
c) the organic content of the solid/liquid waste
d) the calorific value (CV) of the waste Typically the syngas derived provides a CV of 11 MJ/kg and through the CO enhancement system [2-22] the CV of the syngas can be increased to levels slightly below that of natural gas e.g. 12-13 MJ/kg, consequently the syngas produced is safe and stable enough to be used as a fuel in a gas turbine combine cycle system.

The combined cycle power generation system (Block Diagram Ref 5-5) consist of a gas turbine generator [T5-2] driving electrical generator [T5-3] operated in combine cycle with a with a steam turbine generator [T5-4] driving electrical generator [T5-5], in order to maximise the amount of electrical energy produced using a combine cycle power generation system.

An approximation of the electrical power produced in a 'typical' combine cycle system is an additional 20% of the electrical power produced by the gas turbine generator. In this invention, the amount of additional electrical power produced by the steam turbine generator [T5-4] will be in the order of 35% of the electrical power produce by the gas turbine generator [T5-2]. This additional electrical power production is due to the high pressure steam generated in the syngas waste heat steam generator [3-1] which is utilized in the steam turbine generator.

The steam turbine [T5-4] is used as the prime mover for driving electrical generator [5-5] and the amount of electrical energy (MWe) will be dependent on the amount and condition of the steam developed by;

a) the heat recovery steam generator [T5-6]
b) the amount of steam utilized from the waste heat steam generator [3-1] and delivered to steam turbine [T5-4]

The combined electrical energy (MWe) produced by the two generators [T5-3] and [T5-5] will be synchronised and thereafter, via a metering system, exported to a local power distribution grid for other users.

The power generation system consists of conventional equipment the main components of which are a heat recovery steam generator [T5-6], a de-mineralised water making system [T5-7], and fin fan steam condenser complete with deaerator [T5-8]

Stage 5b—Steam Cycle Power Generation System (Block Flow Diagram Ref 5-6)

The syngas after being conditioned in the recuperator [4-3] is delivered to a moisture knock-out drum [5-1] as a final stage of protection for moisture removal before the syngas is delivered to steam boilers [B5-2] and [B5-3]. The burners of the steam boilers used are modified for use with syngas to ensure stability of burners [B5-2a] and [B5-3a] operation remains stable within the band defining the syngas's calorific value. The syngas, having been treated in the previously discussed syngas cooling, cleaning and conditioning systems, is used as a fuel to fire the burners [5-2a] and [5-3a] of the steam boilers [B5-2] and [B5-3] which will generate high pressure steam for steam turbines [B5-4] and: [B5-5] for driving the electrical generators [B5-6] and [B5-7]. As with the gas turbine power generation system, the amount of electrical energy (MWe) that will be produced by electrical generators [B5-6] and [B5-7] will depend on several factors being:

a) the amount of solid/liquid waste to be destroyed
b) the moisture content of the waste
c) the organic content of the solid/liquid waste
d) the calorific value (CV) of the waste Typically the syngas derived provides a CV of 11 MJ/kg and through use of the CO enhancement system [2-22] in the ATGR [2-4], the CV of the syngas can be adjusted to levels slightly below that of natural gas i.e. 12-13 MJ/kg. Additionally the syngas produced is safe and stable enough to be used as a fuel in burners to fire steam boilers.

The steam cycle power generation system consist of two high efficiency steam turbines [B5-4] and [B5-5] each driving a power generator [B5-6] and [B5-7] respectively in order to maximise the amount of electrical energy produced. The power produced using high efficiency steam turbines as part of this invention is commensurate with a 'typical' steam cycle power plant fired by natural gas using similar equipment, and will be no different to a 'typical' steam cycle in as much each steam cycle power generation plant is dependent on the amount and condition of the steam developed by the quantity and quality of steam generated in the steam boilers. In the case of this invention, utilizing steam cycle power generation system however, there is the added benefit of steam generated by the waste heat steam generator [2-14] which is also delivered to the steam turbines thus increasing the gross electrical power generated.

The combined electrical energy (MWe) produced by the two electrical power generators [B5-6] and [B5-7] will be synchronised and thereafter, via a metering system, exported to a local power distribution grid for other users.

The design of this plant using steam cycle power generation incorporates a facility for interchanging the steam boilers [B5-2] and [B5-3] with the steam turbines [B5-4] and [B5-5] thus providing flexibility in the power generation system that provides a level of assurance for maintaining at least fifty percent of the gross power output.

The steam cycle power generation system used in this plant employs conventional equipment the main components of which are; an A-frame steam condenser [B5-8] with deaerator [B5-9].

Stage 5c—Emission Control Systems

The flue gas from the heat recovery steam generator [T5-6] in a combined cycle plant from the steam boilers [B5-2] and [B5-3] in a steam cycle plant will be discharged via a continually monitoring and controlling emissions system [5-10] which is a purpose designed emissions system that monitors for NOx, SOx, $CO_2$, Dioxin and Furan. Any of these elements detected in the flue gases above the permitted levels for a given plant will immediately trigger the emissions control system so that the flue gases entering the continually monitoring and controlling emissions system [5-10] are treated prior to being discharged to atmosphere.

Stage 6. Supporting Utility Systems & Consumables

This plant incorporates unique design features by the integration of standard process and power generation system with the reactor and its ability to maximise the conversion of all inorganic matter fed to it to a high calorific syngas. The design of the plant then cools, cleans and conditions the syngas and to do this support and utility systems will be required, all of which are incorporated into the design of the plant.

These systems involve the delivery of metallurgic coke to the reactor to maintain the necessary gasification temperature and to ensure the sub-stoichiometrtc environment is maintained in the gasification zone of the reactor. Lime is also delivered to the reactor which is used to stabilize the inorganic slag that collects in a molten form in the base of the reactor before being tapped off and vitrified. Both these consumables are delivered to the reactor via the RDF blending feed hoppers [2-1]. The metallurgic coke also provides the carbon bed barrier between the oxidizing and gasification zones in the reactor and in doing so converts any oxygen percolating through the carbon from the oxidizing zone to Carbon Monoxide (CO). This chemical conversion of free oxygen and carbon ensures the gasification zone in the reactor is maintained at a sub-stoichiometric condition and the CO adds energy value to the syngas produce from the RDF.

The metallurgic coke delivered to the reactor acts as a thermal catalyst by providing uniform distribution of thermal energy that has percolated through it from the plasma torches located in the oxidizing. This even distribution of thermal energy also ensures agglomeration of the RDF fed into the reactor [2-4] is avoided.

A vacuum swing absorption unit is included in this plant as a utility system which produces the necessary oxygen at a purity of 93% for enrichment of the air used in the plasma torch system [2-5] and for use in the reactor's CO enhancement system [2-22] and to enhance the catalytic effect of the carbon bed in the reactor. The vacuum swing unit also provides the nitrogen required by the plant as part of this plant's operational consumables.

Nitrogen produced in the vacuum swing absorption utility unit is a fundamental requirement in the design of this plant. Nitrogen is primarily employed as an inert safety agent for purging the plant system in the event of an emergency shut-down. Nitrogen is also used for back-pulsing the bag filter [3-3]. The use of nitrogen for back pulsing the bag filter [3-3] ensures auto ignition of the syngas is avoided while maintaining its calorific value during the cleaning process. Air required for combustion of the syngas is introduced at the air intakes of gas turbine combustors or burner air intakes depending which power generation system is used in this plant.

Various other environmentally safe chemicals are used during the treatment stages of the syngas cooling systems, and in some cases for treatment, of the cooling water to remove any potential scale-forming elements or to prevent potential corrosion processes developing. Environmentally safe chemicals are also used for demineralizing the process water in the steam cycle system.

The plant, once operational i.e. once it is producing syngas, will become self sufficient in providing its own electrical requirements. This self sufficiency in electrical energy is achieved by the inclusion of a cogeneration power systems by way of dual fuel generator sets, which can be either a small diesel/gas turbine generator operating in simple cycle, or diesel/gas engine generators. In either case the plant's electrical requirements will be produced by the generating source initially using either diesel fuel or natural gas to initially run the cogeneration system and thereafter once syngas is produced the cogeneration system will be changed to use syngas produced by the plant. Auxiliary fuel (diesel or natural gas) will be used at times of controlled or emergency shutdowns.

Auxiliary fuel, either diesel fuel oil and/or natural gas, will be made available as fuel to the plant's cogeneration system for;

a) starting up the plant.

b) maintaining normal operation in the event insufficient waste is delivered to the plant.

c) controlled shutdown when the plant is to undergo its annual maintenance.

d) to maintain the operation of the RDF Production System [Block Diagram 1-5] when the plant is shutdown for annual maintenance.

e) to provide power to emergency systems in the event of an emergency shutdown.

The cogeneration system included in this plant's design not only provides the power for running the plant at times of start-up, it also provides the thermal energy necessary for moisture removal from the incoming raw waste received at the Waste Receiving, Sorting and RDF Production system. The thermal energy will be provided by passing the flue gas from the cogeneration system through the tube side of a fin and tube heat-exchanger and raising the temperature of the air for use in the waste dryer [1-7].

The flue gas used for heating the air [1-9] used drying the waste leaving the waste dryer [1-7] at [1-8] is discharged via a continually monitoring and controlling emissions system [1-10] included Waste Receiving, Sorting and RDF Production system. This emissions monitoring is exactly the same as the continually monitoring and controlling emissions system used for monitoring NOx, SOx, $CO_2$, Dioxin and Furan from the plant's power generation system [Block Diagrams 5-15 and 5-6].

Any elements of NOx, SOx, $CO_2$, Dioxin and Furan detected in the cogeneration system's flue gas prior to it entering the continually monitoring and controlling emissions system will immediately trigger the control system so that the flue gas entering the heat-exchanger of the hot air system for the Waste Receiving, Sorting and RDF Production system will be continually monitoring and the flue gas will be treated as necessary before being discharged to atmosphere to ensure it meets the necessary emission requirements.

Figure 6:
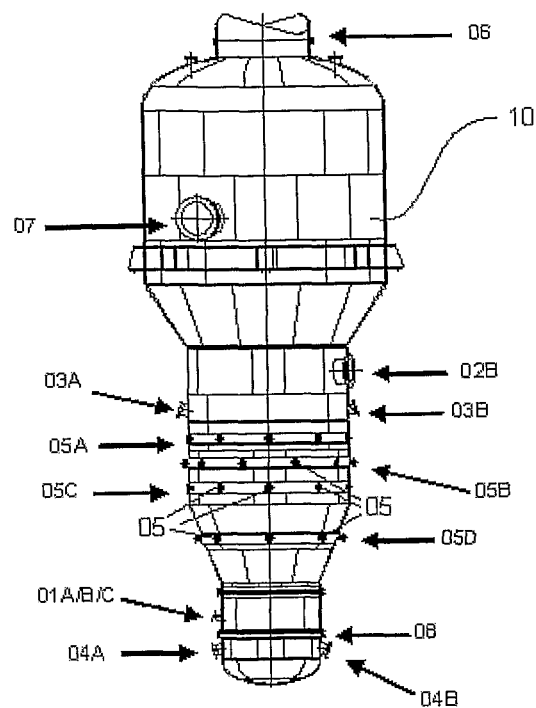
FIG. 6 shows a front view of a thermal reactor according to an embodiment of this invention.
Figure 7:
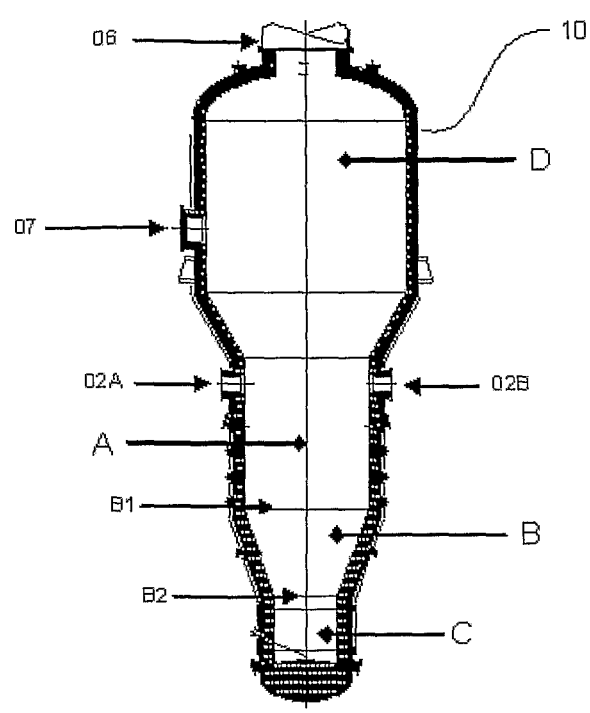
FIG. 7 shows a cross-sectional view of a thermal reactor according to an embodiment of this invention.

FIGS. 6 and 7 show views of the reactor (2-4) of this invention. The reactor includes an elongated vessel (10) having an internal volume, said internal volume comprising an oxidizing zone (C) located at a lower portion of the internal volume, a carbon bed (B) located above the oxidizing zone (C), a gasification zone (A) located above the carbon bed (B), and a gas retention zone (D) located above the gasification zone (A). A carbon bed is located below the gasification zone (A). The temperature of the said gasification zone (A) is in excess of 2000° C.

Thermal energy is supplied into the said oxidizing zone (C) via three inlet tuyeres (01A, 01B, 01C) located equidistant at 120° around a circumference of the vessel (10) and adapted to supply heat into the oxidizing zone (C). The amount and method of supplying the thermal energy is dependent on the waste being processed. The inlet tuyeres (01A, 01B, 01C) are adapted to be compatible with the most suitable type of thermal energy generation system, thus providing flexibility and optimization for the operation of the reactor.

In a preferred embodiment, the thermal energy necessary for gasification of the organic fraction and melting of the inorganic fraction of the waste is provided from three plasma torches (01A, 01B, 01C), which due to their variable operating characteristics will allow the necessary thermal energy to be produced from between one to three of the plasma torches. Each plasma torch, when operational, is supplied with compressed air, which may or may not be heated and/or enriched with oxygen having a purity≥93%. Each operational plasma torch will generate plasma gas that is discharged from the torches at a temperature>6000° C. into the oxidizing zone (C) of the reactor. Each plasma torch (01A, 01B, 01C) can be adjusted from its maximum down to 30% of full capacity, providing a level of flexibility in the production of thermal energy that permits the reactor to operate with a 30% turndown ratio if the quantity of waste being fed is reduced. This flexibility also permits operation of the reactor at lower temperatures thus conserving energy without the need to shutdown consequently avoiding the extensive temperature variations and associated structural contractions/expansions associated with the starting up and shutting down of a thermal process.

In other embodiments of this invention, there could be one (01A) or two (01A, 01B) inlet tuyeres. In the case of two inlet tuyeres, they would be placed opposite each other for equal distribution of heat.

Two opposing feed ports (02A, 02B) deliver organic and/or inorganic waste purged with nitrogen into the gasification zone (A). These feed ports are located on opposing sides of the reactor and include slam shut gate valves and sensory arrays to continually monitor for flame-back. In the unlikely event combustion is detected at the interface of the feed ports and the reactor, the slam-shut gate valves wilt be activated to ensure that combustion is contained within the reactor. The waste includes either prepared refuse derived fuel (RDF) or unprepared raw waste or a combination thereof.

Two opposing feed ports (03A, 03B) deliver carbon into the gasification zone (A) where the carbon moves downwards and creates a carbon bed (B) between the gasification zone (A) and the oxidizing zone (C).

An exit port (06) is located at an upper end of said vessel (10) for discharge of syngas from the gas retention zone (D).

Two directly opposing slag ports (04A, 04B) are located at a lower end of the vessel for discharge of molten slag from the oxidizing zone (C).

The organic fraction of the waste upon entering the gasification zone (A) is immediately subjected to a sub-stoichiometric environment at a temperature≥2000° C., causing it to pass through the transition and vibration phases of increasing temperature and on to disassociation of molecular bonds, or gasification as it falls onto the carbon bed top (B1). In this gasification, the organic waste is transformed into a synthesis gas (syngas) and due to its lower density and intrinsic thermal energy rises up the reactor to the gas retention zone (D). The velocity of the syngas as it percolates through the reactor is <2 m/s. The temperature of the syngas is gradually reduced so that, when the resultant syngas exits the reactor via the exit port (06) its temperature will be in the order of 1200° C. to 1400° C.

The reactor breaks down the organic fraction of the waste to its respective molecular levels by way of a no-burn process, and through control of the chemistry at various stages throughout the reactor, will manage the re-formation of chemical bonds to maximise the production of a useable synthesis gas (syngas) while avoiding, or minimising, the formation of unwanted compounds such as $CO_2$, Dioxin and Furan.

The inorganic fraction of the waste upon entering the gasification zone (A) also experiences a rapid increase in temperature causing it to transform from solid to the liquid state as it falls onto the carbon bed top (B1). As this happens, its viscosity is lowered permitting it to permeate through the carbon bed (B) and then to collect in the lower portion of the oxidizing zone (C) as molten slag. Once a predetermined amount (level) of molten slag is collected, one of the two opposing slag ports (04A, 04B) located at a lower portion of the oxidizing zone (C) and protruding through the vessel (10) is opened to discharge the molten slag. After exiting the reactor this molten slag solidifies to become an inert slag with a 'glass' like appearance having a leaching level in the order of 0.005 ppm.

The invention incorporates all necessary temperature, pressure, level and flow instrumentation and control for operating the reactor and to provide protection against upset operational conditions. Safety features are also designed into the reactor for prevention and/or reaction to over and under pressure conditions.

It should be understood that various changes, adaptations and modifications may be made thereto without departing from the gist of the invention and the scope of the claim. It should be understood, therefore, that the invention is not limited to details as illustrated and shown in the figures and that it may include variations as will be apparent to one skilled in the art.

The invention claimed is:

1. A method for producing energy from waste comprising:
    transforming raw waste to refuse derived fuel (RDF);
    delivering organic and/or inorganic RDF into a an RDF blending feed hopper;
    continually purging organic and/or inorganic RDF in the RDF blending feed hopper with nitrogen;
    feeding the RDF from the RDF blending feed hopper to a thermal reactor via a screw feeder including a conical housing, the feeding including compressing the organic and/or inorganic RDF against the conical housing as the RDF is fed to the thermal reactor to squeeze nitrogen from the organic and/or inorganic RDF;
    gasifying any organic fraction of the RDF into a syngas containing heat in a non-combustion process within the thermal reactor, wherein the gasification being a sub-stoichiometric environment;

melting any inorganic fraction of the RDF in the non-combustion process within the thermal reactor;

generating steam using the heat contained within the syngas;

cleaning and conditioning the syngas; and using the steam and/or the syngas as an energy source to drive equipment for generating electricity.

2. The method for producing energy from waste according to claim 1, further comprising: preparing the waste prior to the delivery into the thermal reactor, wherein the preparing includes:

reducing the size of oversized pieces of waste;
crushing the waste;
extracting moisture from the waste;
shredding the waste to a uniform size;
homogenizing moisture content of the waste;
drying and sterilizing the waste in a waste dryer; and
extracting predetermined recyclable material.

3. The method of claim 1, wherein the cleaning and conditioning of the syngas includes:

cleaning the syngas using one or more filters; and
running the syngas through a heat exchanger configured to reduce a temperature of the syngas to between 150° Celsius (C) and 170° C.

4. The method of claim 1, wherein using the steam and/or the syngas includes:

compressing the syngas to a pressure of between 2500 kilopascal (kPa) and 3500 kPa;
using the syngas as a fuel for a gas turbine that is configured to generate electricity;
generating steam from exhaust heat of the gas turbine; and
using the steam from the exhaust to generate electricity in a steam turbine.

5. The method of claim 1, wherein using the steam and/or the syngas includes:

generating steam in at least one steam boiler using the syngas as a fuel; and
using the steam from the at least one boiler to generate electricity in at least one steam turbine.

6. A system for producing energy from waste, the system comprising:

a sealed nitrogen purged conveyor;
a continuously nitrogen purged waste blending feed hopper configured to receive organic and/or inorganic waste from the sealed nitrogen purged conveyor;
a thermal reactor configured to produce a syngas;
a screw feeder positioned between the waste blending feed hopper and the thermal reactor and including a conical housing that is configured to compress the waste to squeeze nitrogen from the waste as the screw feeder delivers the waste the thermal reactor;
a waste heat steam generator configured to generate steam from a portion of the heat contained within the syngas;
a filter configured to clean and condition the syngas; and
an electric generator configured to use the syngas as a fuel,
wherein the thermal reactor is adapted to receive the waste from the screw feeder, to gasify any organic fraction of the waste in a sub-stoichiometric environment into the syngas containing heat, and to melt any inorganic fraction of the waste in a non-combustion process.

7. The system of claim 6, wherein the thermal reactor includes:

an internal volume including an oxidizing zone that is located at a lower portion of the internal volume, a gasification zone that is located above the carbon bed, and a gas retention zone that is located above the gasification zone;
a plasma torch adapted to supply heat into the oxidizing zone;
a plurality of slam shut valves;
a feed port for channeling the organic and/or inorganic waste from the feed hopper into the gasification zone, wherein the feed port includes the plurality of slam shut valves to ensure non-combustion process take place within the thermal reactor;
a coke feed port configured to deliver carbon into the gasification zone, wherein after the carbon enters the gasification zone, the carbon moves downwards and creates a carbon bed below the gasification zone and above the oxidizing zone;
an exit port configured for discharge of gas from the gas retention zone, wherein the exit port is located at an upper end of the vessel; and
a slag port configured for discharge of molten slag from a lower portion of said vessel from the apparatus, wherein the slag port is located at a lower portion of the vessel.

8. The system of claim 7, wherein:

the gasification of any organic fraction of the waste into a syngas occurs by the thermal action of gasified metallurgic coke; and
the gasified metallurgic coke is created by the plasma torch blowing plasma gases onto the coke bed.

9. The system of claim 7, wherein after the inorganic waste enters the gasification zone, the inorganic waste melts and falls onto the carbon bed such that the inorganic waste permeates through the carbon bed and falls into the oxidizing zone to exit via the slag port as inert slag.

10. The system of claim 6, further comprising:

an oversized waste size reducer configured to reduce the size of oversized pieces of waste;
a waste crusher for crushing the waste and removing moisture from the waste;
a waste shredder for shredding the waste into substantially uniform sized portions;
a waste moisture homogenizer configured to homogenize a moisture content of the waste; and
a waste dryer configured to extract moisture from the waste,
wherein the waste moves in a continuously flowing waste stream through two or more of the waste dryer, the waste moisture homogenizer, the waste shredder, the waste crusher, and the oversized waste size reducer.

11. The system of claim 6, further comprising a heat exchanger, said heat exchanger being a gas/gas recuperator configured to reduce a temperature of the syngas to between 150° Celsius (C) and 170° C.

12. The system of claim 6, further comprising a second filter configured to capture volatiles and/or heavy metals within the syngas.

13. The system of claim 6, further comprising a chloride absorber column configured to remove chlorides from the syngas, wherein the chloride absorber column includes a chloride absorber fluid circulated therein.

14. The system of claim 6, further comprising a sulfuric acid removal system.

15. The system of claim 14, wherein the sulfuric acid removal system includes:

a sulfuric acid contactor vessel containing sulfuric acid contactor fluid, wherein the sulfuric acid contactor fluid is able to remove sulfuric acid from the syngas;

a sulfuric acid regeneration degasser vessel configured to receive the sulfuric acid contactor fluid after the sulfuric acid contactor fluid has absorbed sulfuric acid from the syngas, wherein the sulfuric acid regeneration degasser vessel is configured to substantially remove a hydrogen component of the sulfuric acid from the sulfuric acid contactor fluid; and a regeneration surge settler vessel configured to use air to agitate a resultant contactor fluid to encourage removal of remaining sulfuric acid from the resultant contactor fluid.

16. The system of claim 6, wherein the electric generator includes:

a gas turbine configured to use the syngas as a fuel, and to run an electricity generator;

a steam generator that uses heat produced by the gas turbine to generate steam; and a steam turbine that uses the steam from the said steam generator to run an electricity generator.

17. The system of claim 16, wherein the steam from the waste heat steam generator is combined with the steam from the steam generator before being used in the steam turbine.

18. The system of claim 6, wherein the electric generator includes:

a steam boiler that uses the syngas as a fuel; and a steam turbine connected to the steam boiler and configured to use steam from the steam boiler.

* * * * *